US011372649B2

(12) United States Patent
Oks et al.

(10) Patent No.: US 11,372,649 B2
(45) Date of Patent: Jun. 28, 2022

(54) FLOW CONTROL FOR MULTI-THREADED ACCESS TO CONTENTIOUS RESOURCE(S)

(71) Applicant: Microsoft Technology Licensing, LLC, Redmond, WA (US)

(72) Inventors: Stanislav A Oks, Kirkland, WA (US); Wonseok Kim, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 16/565,752

(22) Filed: Sep. 10, 2019

(65) Prior Publication Data

US 2020/0401411 A1 Dec. 24, 2020

Related U.S. Application Data (60) Provisional application No. 62/865,652, filed on Jun. 24, 2019.

(51) Int. Cl.
*G06F 9/38* (2018.01)
*G06F 9/30* (2018.01)
*G06F 9/50* (2006.01)
*G06F 9/52* (2006.01)
*G06F 9/48* (2006.01)

(52) U.S. Cl.
CPC .......... *G06F 9/3851* (2013.01); *G06F 9/3009* (2013.01); *G06F 9/3891* (2013.01); *G06F 9/4881* (2013.01); *G06F 9/5016* (2013.01); *G06F 9/5027* (2013.01); *G06F 9/52* (2013.01)

(58) Field of Classification Search
CPC .... G06F 9/3009; G06F 9/3851; G06F 9/3891; G06F 9/4881; G06F 9/5016; G06F 9/5027; G06F 9/52; G06F 9/526
See application file for complete search history.

(56) References Cited

U.S. PATENT DOCUMENTS

| 6,366,946 | B1 | 4/2002 | Christensen |
| 6,795,873 | B1* | 9/2004 | Barth .................. G06F 9/52 |
| | | | 711/219 |
| 9,824,225 | B1 | 11/2017 | Polansky |
| 2003/0061394 | A1 | 3/2003 | Buch |

(Continued)

OTHER PUBLICATIONS

"International Search Report and Written Opinion Issued in PCT Application No. PCT/US2020/031543", dated Jul. 24, 2020, 12 Pages.

(Continued)

*Primary Examiner* — Jorge A Chu Joy-Davila
(74) *Attorney, Agent, or Firm* — Rainier Patents, P.S.

(57) ABSTRACT

Described herein is a system and method of performing flow control for multi-threaded access to contentious resource(s) (e.g., shared memory). A request to enter a critical section of code by a particular thread of a plurality of concurrent threads is received. A determination is made as to whether or not to allow the particular thread to enter the critical section of code based, at least in part, upon a CPU core associated with the particular thread, a state associated with the particular thread, and/or a processing rate in the critical session of code associated with the particular thread. When it is determined to allow the particular thread to enter the critical section of code, the particular thread is allowed to enter the critical section of code.

21 Claims, 6 Drawing Sheets

(56) References Cited

U.S. PATENT DOCUMENTS

| | | | |
|---|---|---|---|
| 2006/0277551 A1* | 12/2006 | Accapadi | G06F 9/5077 |
| | | | 718/107 |
| 2009/0328058 A1 | 12/2009 | Papaefstathio et al. | |
| 2011/0282850 A1 | 11/2011 | Kamra et al. | |
| 2012/0054760 A1* | 3/2012 | Chung | G06F 9/526 |
| | | | 718/103 |
| 2014/0123150 A1 | 5/2014 | Lindholm et al. | |
| 2015/0205646 A1* | 7/2015 | Singh | G06F 9/526 |
| | | | 718/106 |
| 2017/0090999 A1* | 3/2017 | Weber | G06F 9/528 |
| 2017/0109209 A1 | 4/2017 | Bailey et al. | |
| 2017/0351441 A1 | 12/2017 | Marinescu | |
| 2018/0046507 A1 | 2/2018 | Borlick et al. | |
| 2020/0134182 A1* | 4/2020 | Ma | G06F 9/48 |
| 2020/0264920 A1* | 8/2020 | Francois | G06F 9/3851 |

OTHER PUBLICATIONS

"How to resolve last-page insert PAGELATCH_EX contention in SQL Server", Retrieved From /web.archive.org/web/20190108105704/ https://support.microsoft.com/en-us/help/4460004/performance-degradation-because-of-pagelatch-ex-contention-issue-in-sq, Jan. 8, 2019, 6 Pages.

Agarwal, Sunil, "SQL Database Engine Blog", Retrieved From blogs.msdn.microsoft.com/sqlserverstorageengine/2018/06/04/clustered-columnstore-index-massively-parallel-trickle-insert/, Jun. 4, 2018, 6 Pages.

Foote, Richard, "Introduction To Reverse Key Indexes: Part I", Retrieved From richardfoote.wordpress.com/2008/01/14/introduction-to-reverse-key-indexes-part-i/, Jan. 14, 2008, 10 Pages.

Milener, et al., "Set Index Options", Retrieved From docs.microsoft.com/en-us/sql/relational-databases/indexes/set-index-options?view=sql-server-2017, Jun. 26, 2019, 4 Pages.

Lopes, Pedro,"PAGELATCH_EX waits and heavy inserts", Retrieved From blogs msdn.microsoft.com/blogdoezequiel/2013/05/23/pagelatch_ex-waits-and-heavy-inserts/, May 23, 2013, 35 Pages.

Lopes, et al., "Alter Index (Transact-SQL)", Retrieved From docs.microsoft.com/en-us/sql/t-sql/statements/alter-index-transact-sql?view=sql-server-2017. Aug. 21, 2019, 37 Pages.

Lopes, et al., "Create Index (Transact-SQL)", Retrieved From docs.microsoft.com/en-us/sql/t-sql/statements/create-index-transact-sql?view=sql-server-2017. Aug. 21, 2019, 38 Pages.

Milener, et al., "Alter Table index_option (Transact-SQL)", Retrieved From docs.microsoft.com/en-us/sql/t-sql/statements/alter-table-index-option-transact-sql?view=sql-server-2017, Jun. 26, 2019, 9 Pages.

Milener, et al., "Indexes on Computed Columns", Retrieved From docs.microsoft.com/en-us/sql/relational-databases/indexes/indexes-on-computed-columns?view=sql-server-2017, Nov. 19, 2018, 5 Pages.

Milener, et al., "INDEXPROPERTY (Transact-SQL)", Retrieved From docs.microsoft.com/en-us/sql/t-sql/functions/indexproperty-transact-sql?view=sql-server-2017, Jun. 26, 2019, 7 Pages.

Milener, et al., "sys.indexes (Transact-SQL)", Retrieved docs.microsoft.com/en-us/sql/relational-databases/system-catalog-views/sys-indexes-transact-sql?view=sql-server-2017, Jun. 26, 2019, 6 Pages.

Rabeler, et al., "Create Table (Transact-SQL)", Retrieved From docs.microsoft.com/en-us/sql/t-sql/statements/create-table-transact-sql?view=sql-server-2017, Jun. 26, 2019, 53 Pages.

Milener, et al., "Create Indexed Views", Retrieved From docs.microsoft.com/en-us/sql/relational-databases/views/create-indexed-views?view=sql-server-2017, Nov. 19, 2018, 9 Pages.

* cited by examiner

FLOW CONTROL FOR MULTI-THREADED ACCESS TO CONTENTIOUS RESOURCE(S)

RELATED APPLICATION

This application claims priority to U.S. Provisional Application No. 62/865,652, filed Jun. 24, 2019, entitled "Flow Control for Multi-threaded Access to Contentious Resource(s)", the disclosure of which is hereby incorporated by reference herein in its entirety.

BACKGROUND

Modern computers can contain multiple CPUs that are installed in separate sockets. Each CPU can host multiple physical processor cores, each capable of processing one or two separate instruction streams simultaneously. These individual instruction stream processors can be managed by the operating system as logical processors.

Program in the operating system run in the context of a process. Although processes contain the program modules, context and environment, processes are not directly scheduled to run on a processor. Instead, threads that are owned by a process are scheduled to run on a processor. A thread maintains execution context information. Computation can be managed as part of a thread. Thread activity thus fundamentally affects measurements and system performance.

Because the number of processors in a system is limited, all threads cannot be run at the same time. The operating system can implement processor time-sharing, which allows a thread to run for a period of time before the processor switches to another thread. The act of switching between threads is called a context-switch and it is performed by a component of the operating system component.

SUMMARY

Described herein is a system for flow control, comprising: a processing system comprising a processor and a memory having computer-executable instructions stored thereupon which, when executed by the processor, cause the processing system to: receive a request to enter a critical section of code by a particular thread of a plurality of concurrent threads; determine whether or not to allow the particular thread to enter the critical section of code based, at least in part, upon a CPU core associated with the particular thread; and when it is determined to allow the particular thread to enter the critical section of code, allow the particular thread to enter the critical section of code.

Also described herein is a method of performing flow control for multi-threaded access to a contentious resource, comprising: receiving a request to enter a critical section of code by a particular thread of a plurality of concurrent threads; determining whether or not to allow the particular thread to enter the critical section of code based, at least in part, upon a state associated with the particular thread; and when it is determined to allow the particular thread to enter the critical section of code, allowing the particular thread to enter the critical section of code.

Further described herein is a computer storage media storing computer-readable instructions that when executed cause a computing device to: receive a request to enter a critical section of code by a particular thread of a plurality of concurrent threads; determine whether or not to allow the particular thread to enter the critical section of code based, at least in part, upon a CPU core associated with the particular thread associated with the particular thread, a state associated with the particular thread, and a processing rate in the critical session of code; and when it is determined to allow the particular thread to enter the critical section of code, allow the particular thread to enter the critical section of code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to flow control for multi-threaded access to contentious resource(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding flow control for multi-threaded access to contentious resource(s) (e.g., shared resource(s)). What follows are one or more exemplary systems and methods.

Aspects of the subject disclosure pertain to the technical problem of providing flow control for multi-threaded access to contentious resource(s). The technical features associated with addressing this problem involve receiving a request to enter a critical section of code by a particular thread of a plurality of concurrent threads; determining whether or not to allow the particular thread to enter the critical section of code based, at least in part, upon a CPU core associated with the particular thread, a state associated with the particular thread (e.g., running, ready, and/or waiting), and/or a processing rate in the critical session of code associated with the particular thread; and when it is determined to allow the particular thread to enter the critical section of code, allowing the particular thread to enter the critical section of code. Accordingly, aspects of these technical features exhibit technical effects of more efficiently and effectively scheduling threads of a multi-threaded environment, for example, increasing the throughput of the system while reducing the wait time and/or overhead.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

For purposes of explanation and not limitation, the system and method described herein will be discussed in the context of a shared database resource such as a page of an index. When a contention point builds up on a resource within a process such as the last page of an index with a sequential key, increased concurrent access to this resource has a tendency to build up a traffic jam of threads behind the resource (e.g., one thread holding a mutually exclusive lock and the remaining threads waiting for the mutually exclusive lock). Conventionally, operating system components have limited allowing up to a predefined quantity of threads to wait for access to the locked resource.

The system and method describe herein provide flow control upstream of the resource which allows for control of the rate at which the threads can request the resource. Using information about the thread(s), a selection of which thread(s) can enter the critical section of code. In this manner, traffic is kept moving rather than having it backup as threads wait for the resource. This can have the effect of keeping the rate of throughput substantially constant while increasing traffic. Without this flow control, throughput can degrade (e.g., exponentially) as concurrency increases.

Typically, this shared resource contention has been addressed by partitioning the resource and/or introducing a semaphore. Partitioning is not always straightforward or even possible in certain scenarios. In the case of indexes, partitioning involves user intervention to change the schema of the index, and it can have a negative impact on other areas such as query performance. Unlike a semaphore which simply controls the traffic based on a fixed number of threads, the mechanism described herein provides flow control based on condition(s) associated with the particular thread, such as which CPU the particular thread is on, a state of the particular thread, and/or the rate at which the particular thread is completing work.

Figure 1:
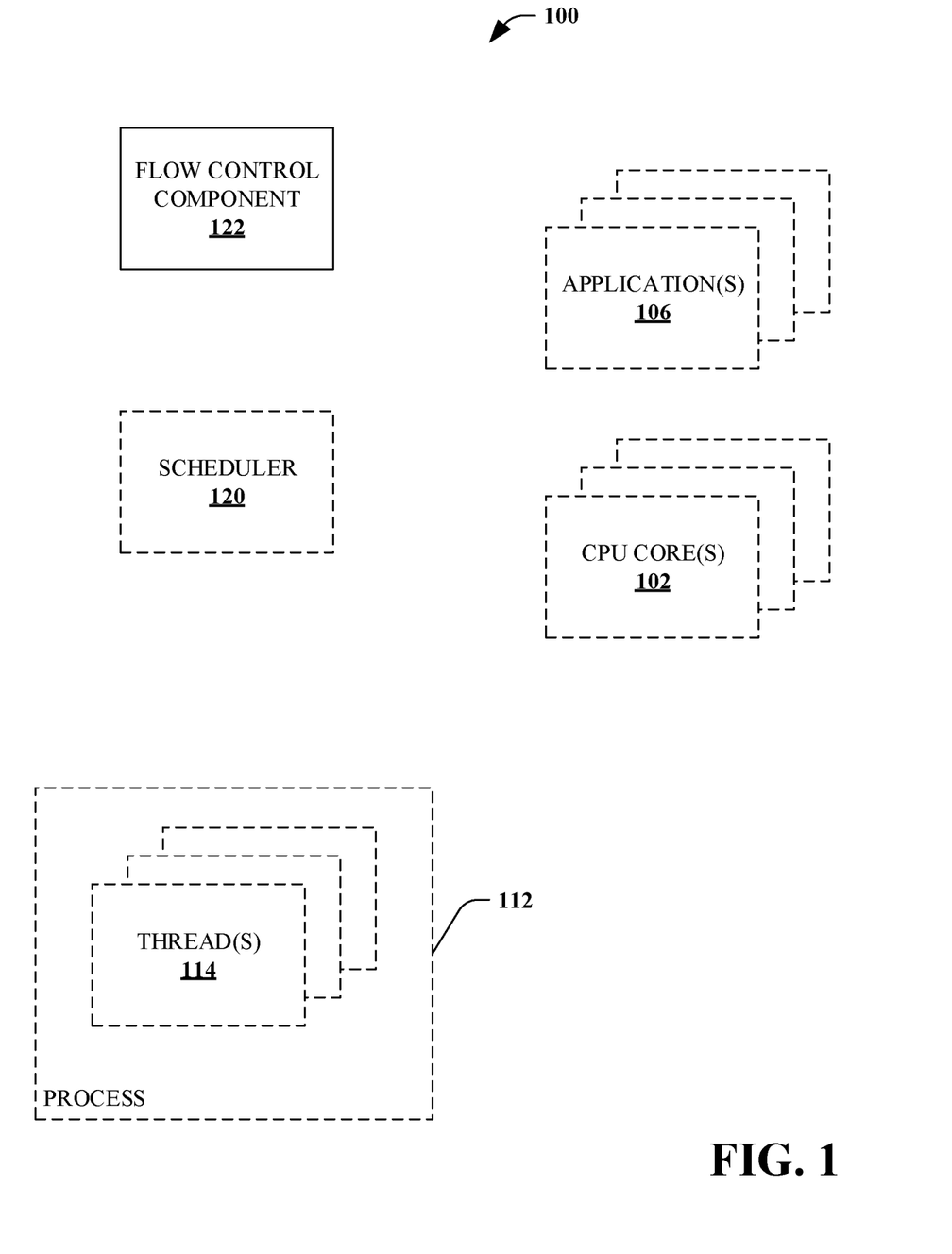
FIG. 1 is a functional block diagram that illustrates a system for flow control.

Referring to FIG. 1, a system for flow control 100 is illustrated. The system 100 includes one or more CPU cores 102, and, one or more applications 106. The processor cores 102 can be included as part of a single processor (e.g., a multi-core processor) chip and/or as part of separate processor chips. In some embodiments, the processor cores 102 are a set of homogeneous processor cores 102. A set of homogeneous processor cores have the same physical characteristics, such as the same architecture, the same performance frequency range, the same power efficiency index, and so forth. Alternatively, the processor cores 102 may include processor cores having different physical characteristics.

The applications 106 can be any of a variety of different types of applications, such as productivity applications, gaming or recreational applications, utility applications, and so forth.

The applications 106 are executed as one or more processes 112 on the computing device 100. Each process 112 is an instantiation of an application 106. Each process 112 typically includes one or more threads 114. However, in some situations a process 112 does not include multiple threads 114, in which case the process can be treated as a single thread process.

Execution of the applications 106 is managed by scheduling execution of the threads 114 of the applications 106. Scheduling a thread for execution refers to informing a CPU core 102 to execute the instructions of the thread.

The system 100 further includes a scheduler 120 that determines which threads 114 to schedule at which times for execution by which processor cores 102. The scheduler 120 can make these scheduling decisions in a variety of different manners based on various public and/or proprietary techniques, such as based on the priorities assigned to threads by an operating system, based on how much execution time each thread has already been scheduled for, and so forth.

The system 100 further includes a flow control component 122 that maximizes concurrency and increases throughput of the system 100 by performing flow control by determining which threads are allowed to enter a critical section of code that accesses a resource (e.g., shared memory). In some embodiments, the flow control component 122 can be a component of the operating system. In some embodiments, the flow control component 122 can be a component of one or more applications 106. In some embodiments, the flow control component 122 can belong to a concurrency library which any application 106 can use within a process 112.

The flow control component 122 can provide flow control upstream of the resource by controlling the rate at which the threads can request the resource. Accordingly, traffic is kept moving rather than having it backup as threads wait for the resource. This can have the effect of keeping the rate of throughput substantially constant while increasing traffic. Without this flow control, throughput can degrade (e.g., exponentially) as concurrency increases.

In some embodiments, unlike a semaphore which simply controls the traffic based on a fixed number of threads, the flow control component 122 can provide flow control based on conditions such as which CPU the thread is on, a state of a particular thread, and/or the rate at which the particular thread is completing work.

Conventionally, a lock or semaphore is used to protect a critical section of code which accesses a contentious resource (e.g., shared memory). It has been observed that, in certain systems, when using a dummy fair lock for the code section, the throughput is not constant and degrades (e.g., even exponentially) as the number of concurrencies increases.

The flow control component 122 employs flow control to more effectively utilize locking which can keep the throughput constant or better even though the number of threads increases. In some embodiments, the flow control component 122 can limit the number of concurrent threads to the critical section in a smarter way considering important factor(s), rather than enabling thread races to enter the section and build up a traffic jam.

Conventionally, a counting semaphore can be utilized to limit the number of concurrent threads. However, a counting semaphore is not enough in order to effectively control flow. In some embodiments, the flow control component 122 utilizes CPU-awareness as a factor in performing flow control.

For purposes of explanation and not limitation, consider a first scenario in which it is desired to only allow four threads to enter the critical section and there are four CPU cores 102. A first thread (T1) enters the section and before leaving the section T1 is context-switched to a second thread (T2) on the same CPU core 102. Using only a counting semaphore, when T2 tries to enter the section, T2 may be allowed to enter the section, if less than four threads have been allowed to enter the critical section. So, multiple threads from the same CPU are 102 can enter the critical section. But since they are on the same CPU core 102, only one thread would make actually progress, wasting the opportunities for other CPUs 102 to complete their respective work.

To maximize the concurrency and increase throughput of the system 100, in some embodiments, the flow control component 122 can take into consideration the CPU core 102 of the thread which tries to enter the critical section. In some embodiments, a policy can be applied in which only one thread per CPU core 102 is allowed to enter the critical section. In the four-core example discussed above, one thread from each CPU core 102 can enter the critical section. This allows all the four cores to make progress simultaneously, keeping the throughput high.

In some embodiments, the flow control component 122 utilizes unfairness as a factor in performing flow control (e.g., granting a thread access to the critical section of code). To increase throughput, the flow control component 122 can prefer thread(s) which can enter the critical section of code and make progress more quickly.

For purposes of explanation and not limitation, consider a second scenario in which no additional thread(s) can be allowed to enter the critical section, that is, the critical section is full. A first thread (T1) therefore starts waiting. A second thread (T2) requests permission to enter the critical section. Once the critical section can be accessed by another thread, when the flow control component 122 determines whether to allow T1 or T2 access, the flow control component 122 can take into consideration a state associated with each of the threads (T1 and T2). For example, while T1 may have waited longer (and is in a wait state), if T2 is in a runnable state, the flow control component 122 can allow T2 to enter the critical session since T1 will be slower to start moving as it has to wait for a CPU quantum and context switch cycles.

In some embodiments, the flow control component 122 takes into consideration an anticipated or estimated speed with which a particular thread completes work in the critical section as a factor in performing flow control (e.g., granting a thread access to the critical section of code). For example, the flow control component 122 can prefer a fast moving thread over a slower moving thread (e.g., another kind of unfairness).

For example, the rate at which each thread completes the work in the critical section can be recorded and based on the stored statistics, the flow control component 122 can prefer faster-moving threads when granting access to the critical section. This can help increasing the throughput of the system 100 with a potential drawback of increasing latency of slower thread(s).

In some embodiments, completion speed can be an optional factor, if the completion rate is presumed to be substantially the same/constant (spending same cycles) and/or a thread is stateless, which means the thread doesn't carry the same traits whenever entering the critical section.

FIGS. 2-5 illustrate exemplary methodologies relating to providing flow control for multi-threaded access to shared resource(s). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 2:
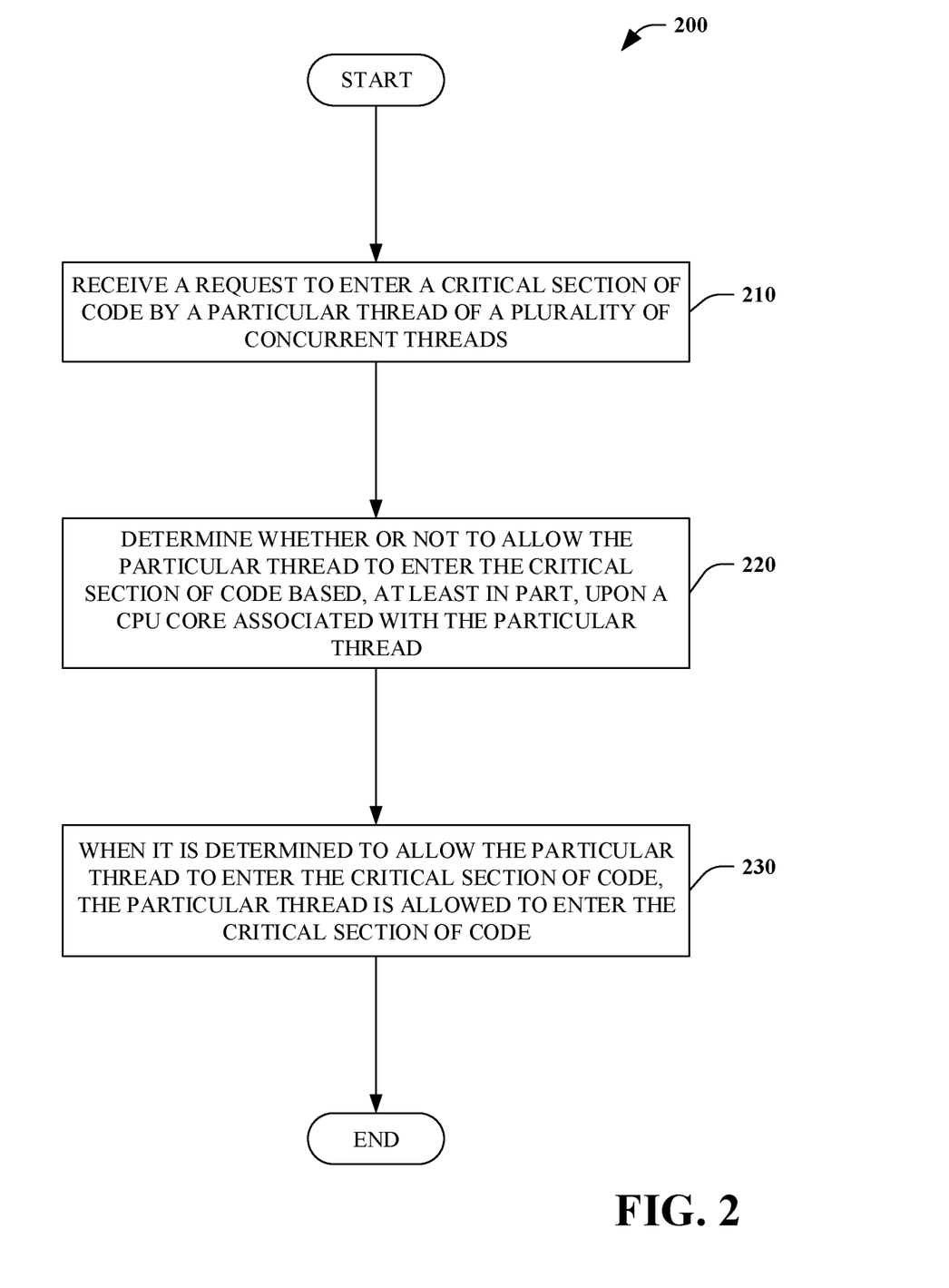
FIG. 2 is a flow chart that illustrates a method of performing flow control for multi-threaded access to a shared resource.

Referring to FIG. 2, a method of performing flow control for multi-threaded access to a shared resource 200 is illustrated. In some embodiments, the method 200 is performed by the system 100.

At 210, a request to enter a critical section of code by a particular thread of a plurality of concurrent threads is received. At 220, a determination is made as to whether or not to allow the particular thread to enter the critical section of code based, at least in part, upon a CPU core associated with the particular thread. At 230, when it is determined to allow the particular thread to enter the critical section of code, the particular thread is allowed to enter the critical section of code.

Figure 3:
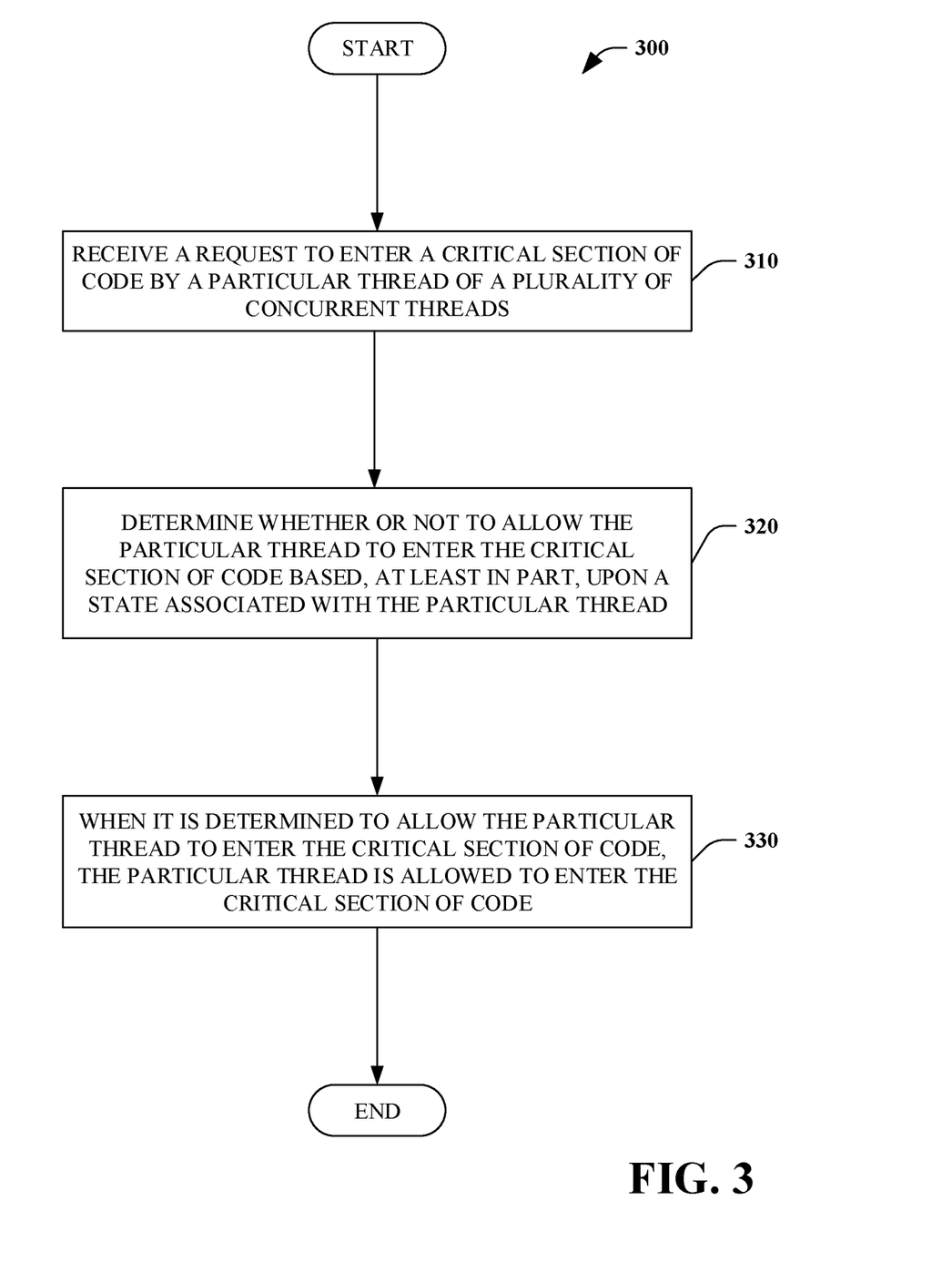
FIG. 3 is a flow chart that illustrates a method of performing flow control for multi-threaded access to a shared resource.

Turning to FIG. 3, a method of performing flow control for multi-threaded access to a shared resource 300 is illustrated. In some embodiments, the method 300 is performed by the system 100.

At 310, a request to enter a critical section of code by a particular thread of a plurality of concurrent threads is received.

At 320, a determination is made as to whether or not to allow the particular thread to enter the critical section of code based, at least in part, upon a state associated with the particular thread. At 330, when it is determined to allow the particular thread to enter the critical section of code, the particular thread is allowed to enter the critical section of code.

Figure 4:
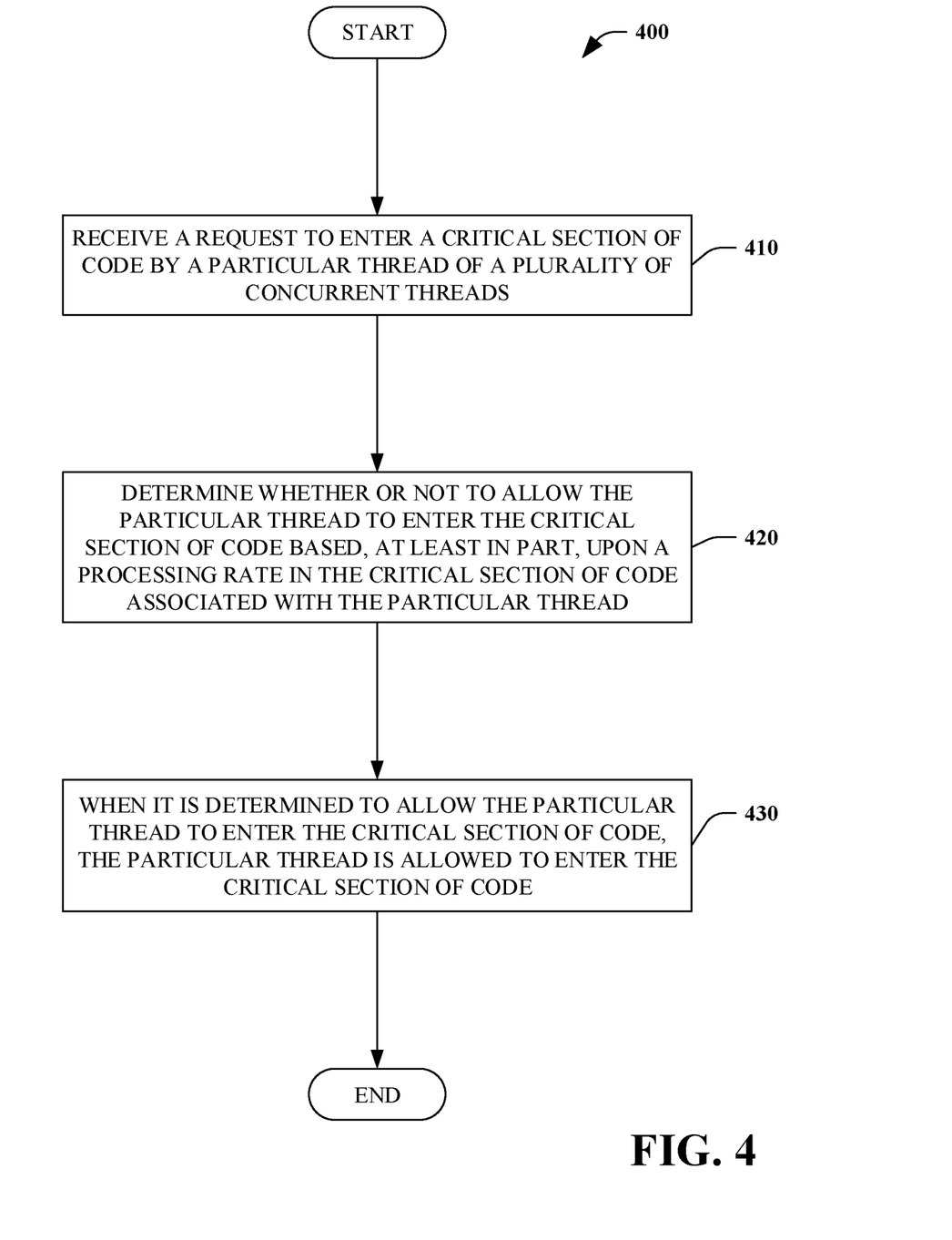
FIG. 4 is a flow chart that illustrates a method of performing flow control for multi-threaded access to a shared resource.

Next, referring to FIG. 4, a method of performing flow control for multi-threaded access to a shared resource 400 is illustrated. In some embodiments, the method 400 is performed by the system 100.

At 410, a request to enter a critical section of code by a particular thread of a plurality of concurrent threads is received. At 420, a determination is made as to whether or not to allow the particular thread to enter the critical section of code based, at least in part, upon a processing rate in the critical section of code associated with the particular thread. At 430, when it is determined to allow the particular thread to enter the critical section of code, the particular thread is allowed to enter the critical section of code.

Figure 5:
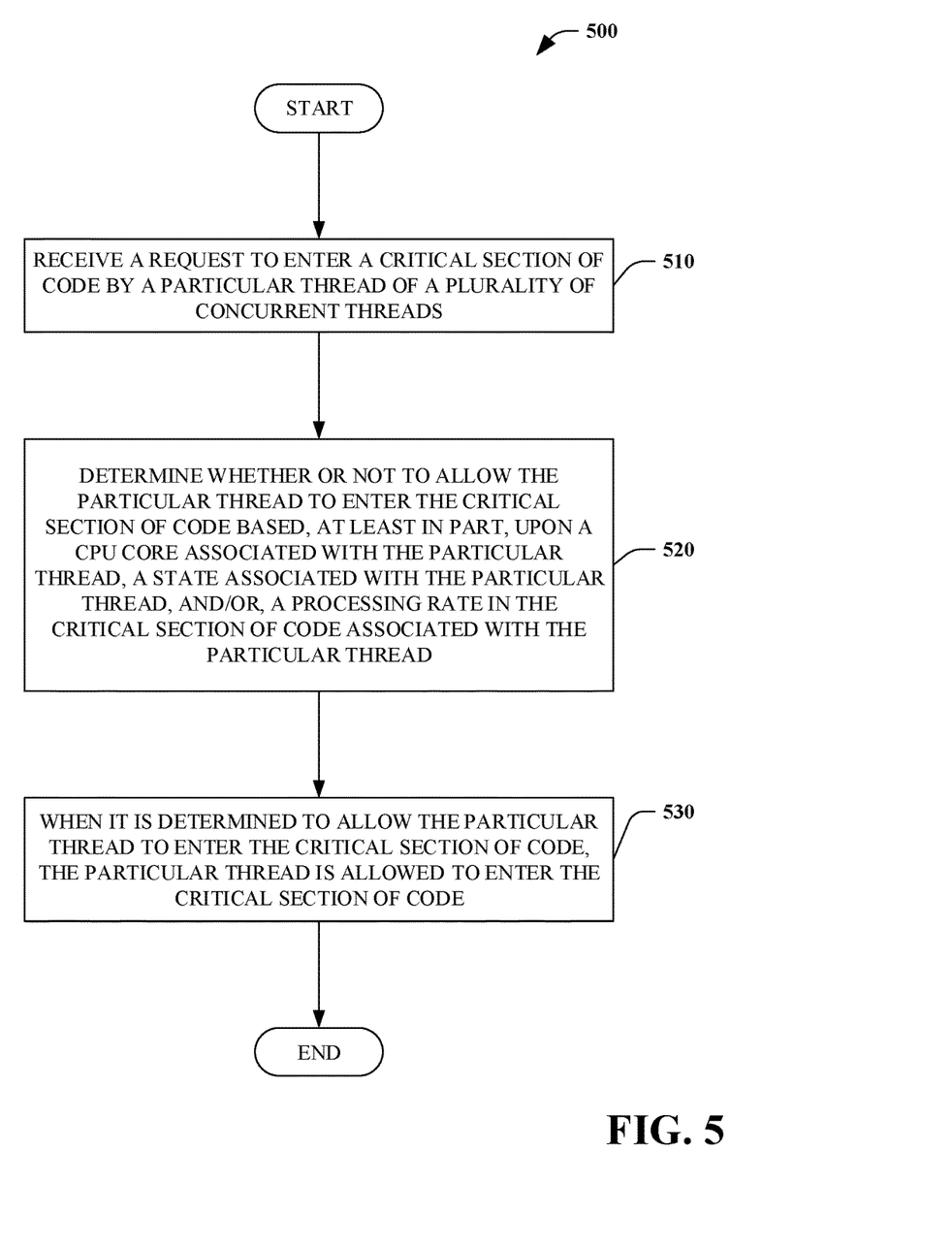
FIG. 5 is a flow chart that illustrates a method of performing flow control for multi-threaded access to a shared resource.

Turning to FIG. 5, a method of performing flow control for multi-threaded access to a shared resource 500 is illustrated. In some embodiments, the method 500 is performed by the system 100.

At 510, a request to enter a critical section of code by a particular thread of a plurality of concurrent threads is received. At 520, a determination is made as to whether or not to allow the particular thread to enter the critical section of code based, at least in part, upon a CPU core associated with the particular thread, a state associated with the particular thread, and/or a processing rate in the critical section of code associated with the particular thread. At 530, when it is determined to allow the particular thread to enter the critical section of code, the particular thread is allowed to enter the critical section of code.

Described herein is a system for flow control, comprising: a processing system comprising a processor and a memory having computer-executable instructions stored thereupon which, when executed by the processor, cause the processing system to: receive a request to enter a critical section of code by a particular thread of a plurality of concurrent threads; determine whether or not to allow the particular thread to enter the critical section of code based, at least in part, upon a CPU core associated with the particular thread; and when it is determined to allow the particular thread to enter the critical section of code, allow the particular thread to enter the critical section of code.

The system can further include wherein the determination of whether or not to allow the particular thread to enter the critical section of code is further based, at least in part, upon a state associated with the particular thread. The system can further include wherein the determination of whether or not to allow the particular thread to enter the critical section of code is further based, at least in part, upon a processing rate in the critical session of code associated with the particular thread. The system can further include wherein the determination of whether or not to allow the particular thread to enter the critical section of code is further based, at least in part, upon a policy to allow only one thread per each CPU core to enter the critical section of code.

The system can further include wherein the critical section of code comprises a request to access a shared database resource. The system can further include wherein the shared database resource comprises a page of an index. The system can further include wherein the critical section of code comprises a request to access a shared memory.

The system can further include wherein the CPU core is one of a plurality of CPU cores of a multi-core processor chip. The system can further include wherein the CPU core is one of a plurality of CPU cores, at least some of the plurality of CPU cores on different processor chips.

Described herein is a method of performing flow control for multi-threaded access to a contentious resource, comprising: receiving a request to enter a critical section of code by a particular thread of a plurality of concurrent threads; determining whether or not to allow the particular thread to enter the critical section of code based, at least in part, upon a state associated with the particular thread; and when it is determined to allow the particular thread to enter the critical section of code, allowing the particular thread to enter the critical section of code.

The method can further include wherein the determination of whether or not to allow the particular thread to enter the critical section of code is further based, at least in part, upon a CPU core associated with the particular thread. The method can further include wherein the determination of whether or not to allow the particular thread to enter the critical section of code is further based, at least in part, upon a policy to allow only one thread per each CPU core to enter the critical section of code.

The method can further include wherein the determination of whether or not to allow the particular thread to enter the critical section of code is further based, at least in part, upon a processing rate of in the critical session of code associated with the particular thread. The method can further include wherein the critical section of code comprises a request to access a shared database resource. The method can further include wherein the shared database resource comprises a page of an index. The method can further include wherein the critical section of code comprises a request to access a shared memory.

Described herein is a computer storage media storing computer-readable instructions that when executed cause a computing device to: receive a request to enter a critical section of code by a particular thread of a plurality of concurrent threads; determine whether or not to allow the particular thread to enter the critical section of code based, at least in part, upon a CPU core associated with the particular thread associated with the particular thread, a state associated with the particular thread, and a processing rate in the critical session of code; and when it is determined to allow the particular thread to enter the critical section of code, allow the particular thread to enter the critical section of code.

The computer storage media can further include wherein the determination of whether or not to allow the particular thread to enter the critical section of code is further based, at least in part, upon a policy to allow only one thread per each CPU core to enter the critical section of code. The computer storage media can further include wherein the critical section of code comprises a request to access a shared database resource. The computer storage media can further include wherein the critical section of code comprises a request to access a shared memory.

Figure 6:
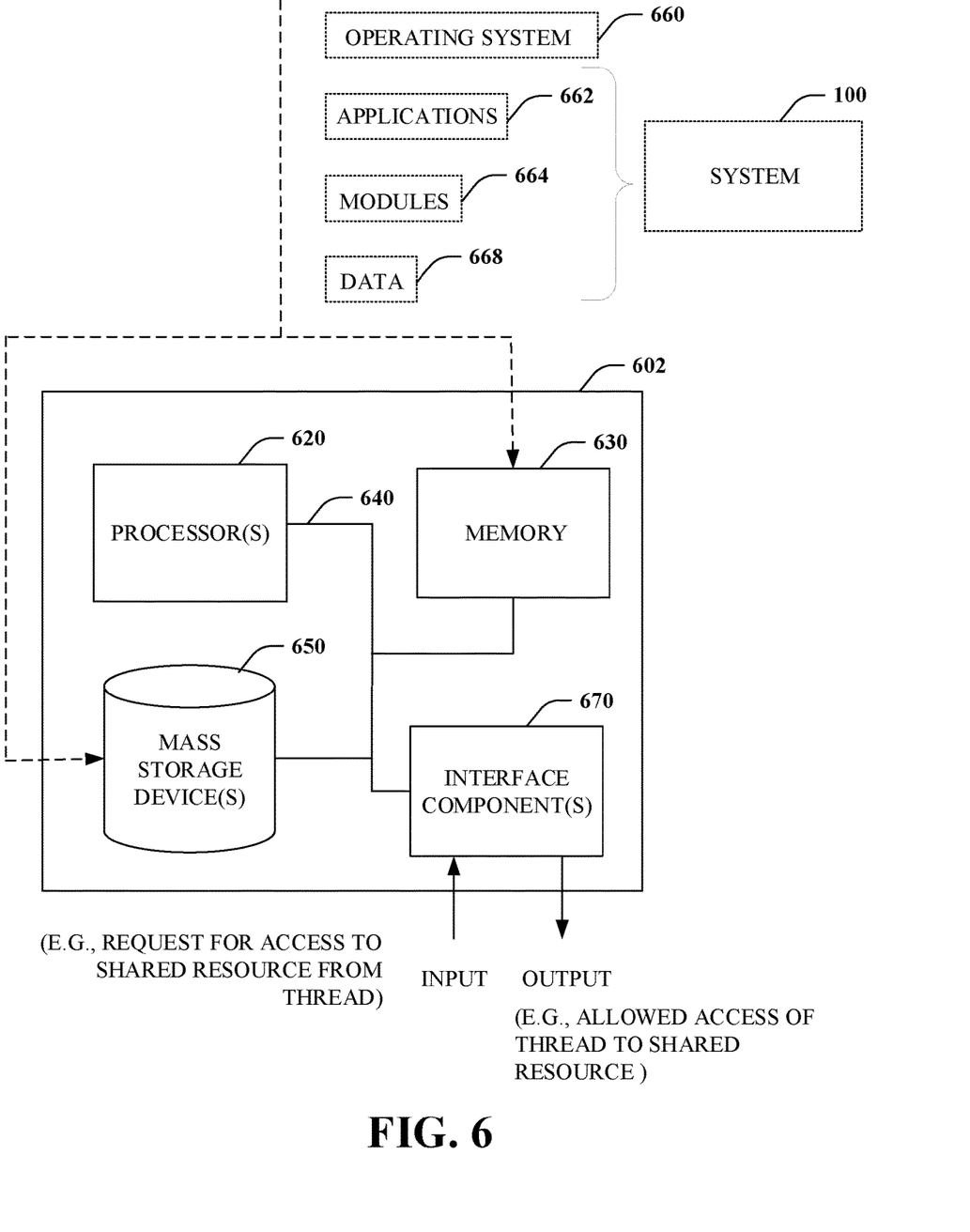
FIG. 6 is a functional block diagram that illustrates an exemplary computing system.

With reference to FIG. 6, illustrated is an example general-purpose computer, processing system, or computing device 602 (e.g., mobile phone, desktop, laptop, tablet, watch, server, hand-held, programmable consumer or industrial electronics, set-top box, game system, compute node, etc.). For instance, the computing device 602 may be used in a system for flow control 100.

The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630. The instructions may be, for instance, instructions for implementing functionality described as being carried out by one or more components discussed above or instructions for implementing one or more of the methods described above.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 620 can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory, etc.) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but is not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 668. The operating system 660 acts to control and allocate resources of the computer 602. Applications 662 include one or both of system and application software and can exploit management of resources by the operating system 660 through program modules 664 and data 668 stored in memory 630 and/or mass storage device (s) 650 to perform one or more actions. Accordingly, applications 662 can turn a general-purpose computer 602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 662, and include one or more modules 664 and data 668 stored in memory and/or mass storage device(s) 650 whose functionality can be realized when executed by one or more processor(s) 620.

In some embodiments, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g. serial, parallel, PCMCIA, USB, FireWire, etc.) or an interface card (e.g., sound, video, etc.) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 670 can be embodied as an output peripheral interface to supply output to displays (e.g., LCD, LED, plasma, etc.), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
at least one processor; and
at least one memory having computer-executable instructions stored thereupon which, when executed by the at least one processor, cause the system to:
receive requests to enter critical sections of code by a plurality of concurrent threads;
determine anticipated processing speeds of the plurality of concurrent threads when executing the critical sections;
select a first thread to enter a corresponding first critical section of code based, at least in part, upon the anticipated processing speeds indicating that the first thread is anticipated to be faster-moving than at least one other slower-moving thread of the plurality of concurrent threads; and
allow the first thread to enter the first critical section of code before the at least one other slower-moving thread of the plurality of concurrent threads enters at least one other corresponding critical section.

2. The system of claim 1, wherein the computer-executable instructions, when executed by the at least one processor, cause the system to:
determine whether or not to allow the first thread to enter the first critical section of code based, at least in part, upon a state associated with the first thread.

3. The system of claim 1, wherein the computer-executable instructions, when executed by the at least one processor, cause the system to:
determine whether or not to allow the first thread to enter the first critical section of code based, at least in part, upon whether the first thread is in a running state, a ready state, or a waiting state.

4. The system of claim 1, wherein the computer-executable instructions, when executed by the at least one processor, cause the system to:
determine whether or not to allow the first thread to enter the first critical section of code based, at least in part, upon a policy to allow only one thread per each CPU core to enter the critical section of code.

5. The system of claim 1, wherein the critical sections of code comprise requests to access a shared database resource.

6. The system of claim 5, wherein the shared database resource comprises a page of an index.

7. The system of claim 1, wherein the critical sections of code comprise requests to access a shared memory.

8. The system of claim 1, wherein the first thread executes on a CPU core that is one of a plurality of CPU cores of a multi-core processor chip that executes one or more other concurrent threads of the plurality.

9. The system of claim 1, wherein the first thread executes on a CPU core that is one of a plurality of CPU cores that execute one or more other concurrent threads of the plurality, at least some of the plurality of CPU cores on different processor chips.

10. A method, comprising:
receiving requests to enter critical sections of code by a plurality of concurrent threads, wherein the critical sections comprise requests to access a resource shared by the plurality of concurrent threads;
determining anticipated processing speeds of the plurality of concurrent threads when executing the critical sections;
selecting a first thread to enter a corresponding first critical section of code based, at least in part, upon the anticipated processing speeds indicating that the first thread is anticipated to be faster-moving than at least one other slower-moving thread of the plurality of concurrent threads; and
allowing the first thread to enter the first critical section of code before the at least one other slower-moving thread of the plurality of concurrent threads enters at least one other corresponding critical section.

11. The method of claim 10, wherein the first thread is selected to enter the first critical section of code based, at least in part, upon information relating to a CPU core on which the first thread is allowed to enter the first critical section.

12. The method of claim 11, wherein the first thread is selected to enter the first critical section of code based, at least in part, upon a policy to allow only one thread per CPU core to enter the critical section of code.

13. The method of claim 10, wherein the the first thread is selected to enter the first critical section of code based, at least in part, upon whether the first thread is in a running state or a waiting state.

14. The method of claim 10, wherein the critical sections of code comprise requests to access a shared database resource.

15. The method of claim 14, wherein the shared database resource comprises a page of an index.

16. The method of claim 10, wherein the critical sections of code comprise requests to access a shared memory.

17. A computer storage media storing computer-readable instructions that, when executed, cause a computing device to:
receive requests to enter critical sections of code by a plurality of concurrent threads;
determine anticipated processing speeds of the plurality of concurrent threads when executing the critical sections;
select a first thread to enter a corresponding first critical section of code based, at least in part, upon the anticipated processing speeds indicating that the first thread is anticipated to be faster-moving than at least one other slower-moving thread of the plurality of concurrent threads; and
allow the first thread to enter the first critical section of code before the at least one other slower-moving thread of the plurality of concurrent threads enters at least one other corresponding critical section.

18. The computer storage media of claim 17, wherein the first thread is selected to enter the first critical section of code based, at least in part, upon a policy to allow only one thread per each CPU core of the computing device to enter a corresponding critical section of code.

19. The computer storage media of claim 17, wherein the critical sections of code comprise requests to access a shared database resource.

20. The computer storage media of claim 17, wherein the critical sections of code comprise requests to access a shared memory.

21. The system of claim 1, wherein the computer-executable instructions, when executed by the at least one processor, cause the system to:
    record statistics reflecting previous processing speeds of each of the plurality of concurrent threads; and
    determine the anticipated processing speeds of the plurality of concurrent threads based at least on the recorded statistics.

\* \* \* \* \*